Dec. 6, 1927.  R. KROEDEL  1,651,460
PHOTOGRAPHIC CAMERA
Filed Feb. 24, 1925
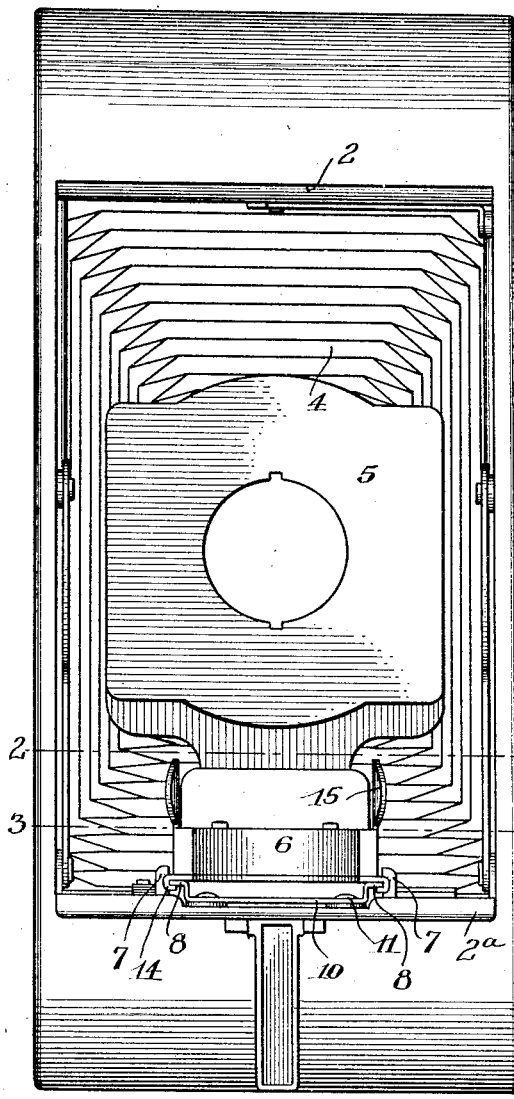
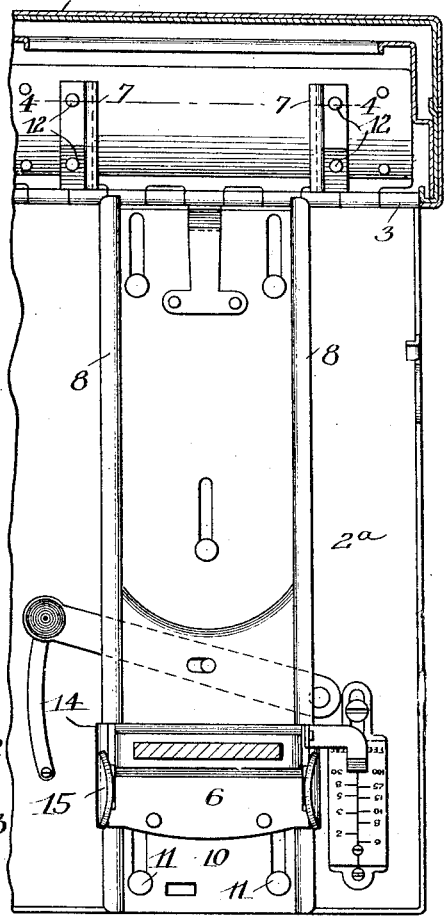
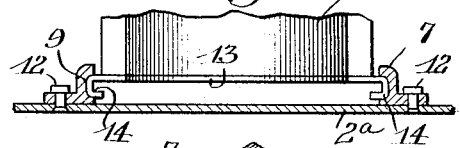
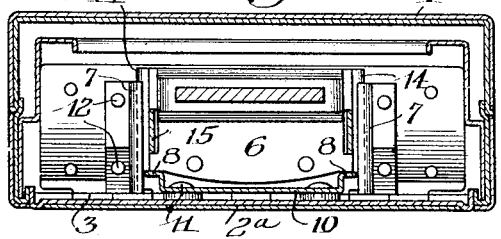
INVENTOR.
Robert Kroedel
BY
his ATTORNEY Patented Dec. 6, 1927.

1,651,460

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

Application filed February 24, 1925. Serial No. 11,087.

My present invention relates to photography and more particularly to photographic cameras and to those of the folding pocket type in which a folding front and bellows are drawn out from a body upon a bed which forms a hinged door for the body or are closed within the body beneath the bed and door and the invention has for its object to provide a camera of this type fitted with an improved track and carriage for the front whereby the latter may be moved with greater facility between the body and the bed.

In the drawings:

Figure 1 is a front view of a folding pocket camera provided with a front, carriage and tracks constructed in accordance with and illustrating one embodiment of my invention;

Figure 2 is a fragmentary plan view of the camera bed with the bellows removed and taken in horizontal section through the body and front substantially on the line 2—2 of Figure 1;

Figure 3 is a horizontal sectional view taken through the camera when folded substantially on the line 3—3 of Figure 1;

Figure 4 is a section through the camera bed on the line 4—4 of Figure 2;

Figure 5 is a perspective view of one of the tracks within the body.

Similar reference numerals throughout the several views indicate the same parts.

The type of camera to which this invention relates as before indicated is the folding pocket type embodying a body 1 having an opening 2 at the front normally closed, when the camera is folded, by a hinged door 2ª that constitutes a bed on which the lens supports move when focusing with the camera extended as in Figure 1. The bed is hinged to the body at 3 and a bellows 4 extends from the margin of the opening 2 to the front 5 supported on the carriage indicated generally at 6. When the door and bed is extended the front is pulled out upon the bed and when the camera is folded the bellows is collapsed and the front and carriage are moved into the recess of the body 1 all as usual in such cameras.

The carriage 6 slides upon continuing tracks one section of which, 7, is located on the floor of the body 1 and the other section of which, 8, is secured to the bed 2. Where these tracks on bed and body are of the same nature or configuration as has heretofore been the case and are arranged in exact alignment, it is necessary to cut one of them off short of the hinge 3 so that they will clear each other and not bind as the door and bed 2 is closed. This results in a break or space between the two when the bed is extended which is apt to cause the carriage to catch or jam in running from one set of tracks to the other.

In the practice of my present invention I so form these tracks that they form a continuous slide for the carriage without, however, being in strict alignment so that the end of the bed section can be brought laterally opposite to the end of the body track section and move past it when swung to folded position. To these ends the track sections 7 in the body are formed (as best shown in Figures 2, 4 and 5) with inwardly turned flanges constituting inside grooves or ways 9 while the track sections 8 on the bed 2ª constitute outwardly turned flanges which are formed on a plate 10 suitably secured to the bed by rivets 11 on which the track 8 slides to a limited extent for focusing purposes. The track sections 7 of the body are shown secured thereto by rivets 12.

On the bottom of the carriage block 6 is a plate 13 having its side edges turned downwardly and inwardly to form yokes or beads as indicated at 14. The rounded flanges thus produced fit slidably in the grooves or ways 9 of the body track sections 7 as shown in Figures 3 and 4. When the carriage is drawn out these outer surfaces of the beads leave the ways 9 and the inside hooked portions of the flanges 14 ride upon the outwardly turned flanges 8 of the bed sections as shown in Figure 1. In other words the thickness of the engaging portion 14 of the carriage makes a clearance between the two differently formed track sections one of which engages exteriorly and the other interiorly. In this way when the bed 2 is folded from the position of Figure 2 to that of Figure 3 the track sections 8 thereon clear the track sections 7 on the body and move to a position between them so that they may be made long enough to extend to the center of the hinge 3. Therefore, as shown in Figure 2, the carriage block has a substantially continuous sliding bearing in moving from the bed into the body or vice versa and is not liable to jam at the joint.

Suitable clamping devices are employed for holding the carriage block in any position to which it is adjusted on the bed but this means is not shown in detail as it forms no part of the present invention. It is sufficient to say that the clamps are released by pinching together the finger pieces shown at 15 by which the carriage is moved on the bed and which, when released, automatically effect the clamping action.

I claim as my invention:

1. In a folding camera, the combination with a body and a bed hinged thereto, of track sections on the bed and body, respectively, focusing devices for moving the track section on the bed relatively to that on the body, and a lens carriage slidably movable from one track section to the other, the respective sections having lateral clearance so that one set of sections moves between the others when the bed is folded.

2. In a folding camera, the combination with a body and a bed hinged thereto, of track sections on the bed and body, respectively, focusing devices for moving the track section on the bed relatively to that on the body and having their proximate ends extending to the axis of the hinge when the bed is extended but offset from each other so that one set of sections moves between the others when the bed is folded, and a lens carriage slidably movable from one track section to the other.

3. In a folding camera, the combination with a body and a bed hinged thereto, of track sections on the bed and body, respectively, focusing devices for moving the track section on the bed relatively to that on the body, those on one part being arranged out of alignment with those on the other but each being provided with guides, those on one of the members being on the outer sides of the track sections and those on the other being on the inner sides of the track sections, and a carriage movable with a continuous sliding movement from one set of sections to the other, said carriage comprising a sheet metal yoke having a hook formation at each side whereby the terminal of the hook engages one track and the bend of the hook engages the other track.

ROBERT KROEDEL.